United States Patent [19]

Becker et al.

[11] 4,312,384
[45] Jan. 26, 1982

[54] ARTICLE OF MANUFACTURE COMPRISING A HOLLOW ROD OF LONGITUDINALLY GATHERED TUBING WITH A SURROUNDING SUPPORT SHEATH

[75] Inventors: Reinhold Becker; Wolfgang Michel, both of Wiesbaden, Fed. Rep. of Germany

[73] Assignee: Hoechst Aktiengesellschaft, Frankfurt am Main, Fed. Rep. of Germany

[21] Appl. No.: 100,746

[22] Filed: Dec. 6, 1979

[30] Foreign Application Priority Data

Dec. 11, 1978 [DE] Fed. Rep. of Germany ....... 2853401

[51] Int. Cl.³ ...................... F16L 11/00; B65D 85/20
[52] U.S. Cl. .................................... 138/109; 138/110; 138/118.1; 138/137; 206/446; 206/525; 206/802; 229/93; 426/105; 428/36
[58] Field of Search ................. 229/93; 206/446, 525, 206/802; 428/36; 138/118.1, 109, 110, 137; 426/105

[56] References Cited

U.S. PATENT DOCUMENTS

| | | | |
|---|---|---|---|
| 2,105,368 | 1/1938 | Parsons | 206/59 |
| 2,150,471 | 3/1939 | Vulpen | 138/118 |
| 2,871,508 | 2/1959 | Hill | 138/118.1 |
| 2,933,866 | 4/1960 | Cranston | 206/446 |
| 3,051,368 | 8/1962 | Schneider | 229/17 |
| 3,148,992 | 9/1964 | Hewitt | 138/118.1 |
| 3,446,634 | 5/1969 | Stahlberger | 426/105 |
| 3,528,825 | 9/1970 | Doughty | 426/105 |
| 3,639,130 | 2/1972 | Eichin et al. | 426/105 |
| 3,864,494 | 2/1975 | Kupcikevicius et al. | 426/284 |
| 3,942,568 | 3/1976 | Stemmler | 150/1 |
| 4,013,099 | 3/1977 | Gerigk et al. | 138/118.1 |
| 4,033,382 | 7/1977 | Eichin et al. | 138/118.1 |

FOREIGN PATENT DOCUMENTS

| | | |
|---|---|---|
| 2733996 | 2/1979 | Fed. Rep. of Germany . |
| 2291015 | 6/1976 | France . |
| 2397791 | 2/1979 | France . |
| 2001234 | 1/1979 | United Kingdom . |

*Primary Examiner*—William R. Dixon, Jr.
*Attorney, Agent, or Firm*—Schwartz, Jeffery, Schwaab, Mack, Blumenthal & Koch

[57] ABSTRACT

An article of manufacture useful in the production of sausages comprising a hollow rod consisting of a longitudinally gathered packing tube and a surrounding support sheath of formable sheet material such as polyethylene with integral end walls each having a central opening therein, said integral end walls being formed in the shape of a truncated pyramid provided with at least two permanently shaped end wall edges radially arranged with respect to the center of the end walls; the end walls are formed by folding the projecting edges of the sheath to form outwardly-projecting, double-layer, triangular flaps; and heat-sealing the sides of the folds to each other; the openings in the end walls of the support sheath allow insertion of a filling tube of a filling machine into the hollow rod in the interior cavity of the support sheath.

4 Claims, 1 Drawing Figure

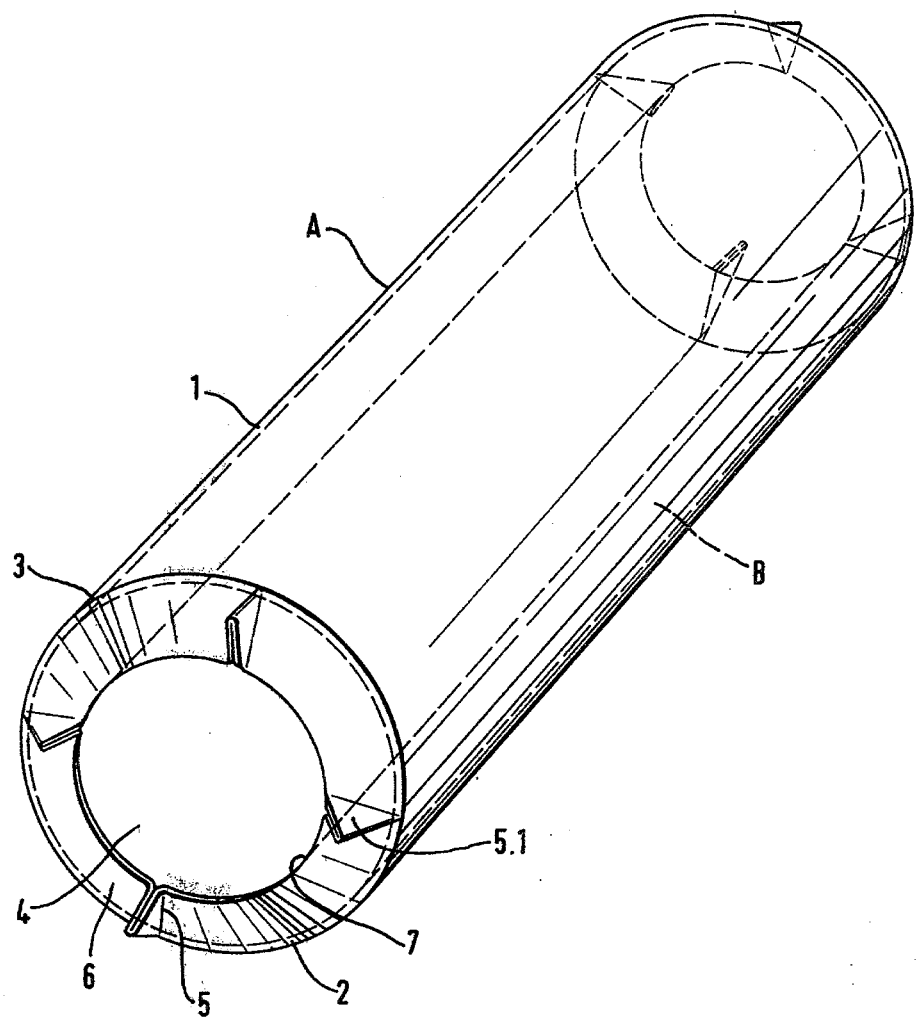

ARTICLE OF MANUFACTURE COMPRISING A HOLLOW ROD OF LONGITUDINALLY GATHERED TUBING WITH A SURROUNDING SUPPORT SHEATH

This invention relates to an article of manufacture which can be readily handled or manipulated uniformly, comprising a hollow rod of a longitudinally gathered and compressed piece of tubing, and a container-like support sheath having a characteristic end wall construction with flexible support ribs constructed as permanently shaped radial edges. Preferably, the tubing is made of fiber-reinforced cellulose hydrate.

The hollow cylindrical body of longitudinally gathered tubing is hereinafter referred to as a "hollow rod".

The term "support sheath" is the designation for the sheathing of formable sheet material for surrounding the hollow rod. The support sheath takes the shape of a hollow cylindrical container, the hollow interior cavity of which is bounded at each end by container end walls having a characteristic structure.

The invention also relates to processes for producing articles having the aforementioned structure.

A further aspect of the invention is the use of the article consisting of a hollow rod with a support sheath which can be manipulated independently in the production of tubular packaging, especially for the production of sausages.

Hollow rods consisting of a longitudinally gathered packing tube, especially a tube of cellulose hydrate which is preferably fiber-reinforced, are used in the production of sausages. In this regard, hollow rods closed at one end are pushed onto the filling tube of a filling machine, and sausage meat is pressed out through the filling tube into the hollow space of the hollow rod, which is closed at one end. The gathered tubing forming the hollow rod is then filled with sausage meat, unfolding continuously while the hollow rod becomes correspondingly shorter.

Before the hollow rods are used for their intended purpose, they are usually soaked in water or moistened. Hollow rods which are wet with water, however, have a tendency to expand considerably in the longitudinal axial direction, and their dimensional stability is no longer ensured to the desired degree. This leads to problems in handling the rods.

According to a proposal which is not as yet part of the state of the art (DE Patent Application 28 09 585.4), a hollow rod or packing tube with a support sheath is described which has openings at its front ends bounded by integral toroids formed with irregular edges. The support sheath has the disadvantage that its outlet openings are not precisely circular and, additionally, that each opening is bounded by a toroid which can have sharp and hard edges. This gives rise to the danger that during or immediately before use of the article of manufacture in accordance with its intended purpose, the start of the packing tube gathered to form a hollow rod, cannot be gripped in order to pull it from the opening of the support sheath in order to form a closed end from this end section of the tube. Due to the sharp edges of the toroid at the support sheath, there is an additional danger that the packing tube may be damaged as it is pulled out of the support sheath.

In DE-OS No. 2,510,637 there is described a hollow rod of a longitudinally gathered packing tube encased with a support sheath. The support sheath is constructed of two parts, namely, a tubular sheath section and an annular element of stable shape for fixing the tubular sheath to and around the hollow rod as an end of the support sheath. This support sheath has the disadvantage, however, that its overturned portions must be relatively long in order to avoid the possibility of an undesirable loosening of the support sheath, particularly if the hollow rod encased by the support sheath is wet with water.

It is an object of the present invention, therefore, to provide an article of manufacture which can be readily handled or manipulated uniformly, comprising a hollow rod with a support sheath surrounding it, during the use of which in accordance with its intended purpose, an end section of the gathered tubing forming the hollow rod can be gripped in a simple manner and can be pulled out of the container while unfolding, without danger of damaging the tubing.

This object is achieved by providing an article of manufacture which can be manipulated uniformly comprising a one-piece, container-like, hollow cylindrical support sheath of formable sheet material having integral end walls with a central opening in each end wall; and an open-ended, hollow rod of longitudinally gathered tubing disposed in the hollow interior of the support sheath with the support sheath surrounding the hollow rod while leaving the opening into the hollow rod free; said support sheath end walls being formed in the shape of a truncated pyramid; said end walls further being provided with at least two permanently shaped end wall edges, said edges being disposed radially with respect to the centers of the end walls.

The expressions "permanently shaped", "permanently of stable shape", "of permanent shape" and "with permanently fixed shape" have identical meanings and indicate that the thusly designated elements of the support sheath have a shape or form which cannot change of its own accord.

The container-like support sheath serves to fix the shape of the hollow rod disposed in its hollow interior cavity. The end walls of the sheath function to prevent undesirable longitudinal expansion of the hollow rod or changing of the shape of the rod, particularly after the hollow rod has been soaked with water in the support sheath.

The casing of the support sheath, (i.e., the piece of sheathing from which the support sheath is produced), has a hollow interior space with a circular cross-section, the diameter of which matches the outside diameter of the hollow rod.

The support sheath, or the piece of sheathing, is made of formable sheet material. The term "formable sheet material" is intended to include flexible sheets of thermoplastic, fusible polymers—such as polyvinyl chloride or, preferably, polyethylene—as well as suitably thin metal foils, such as aluminum foil. Support sheaths of synthetic, thermoplastic polymer are particularly preferred. The term "formable sheet material" also includes tubing of net-like construction, such as net-like tubes of polyethylene material.

The container-like support sheath is of one piece and comprises a straight casing in the shape of a hollow cylinder. Each end of the hollow space of the cylinder is bounded by end walls formed with a characteristic structure which is essential to their function; each of said end walls having a central opening and at least two radial edges.

The respective end walls preferably have an identical spatial design and advantageously are of identical dimensions.

The end walls are provided with a plurality of flexible support ribs of permanent shape, constructed as radial edges. Preferably, there will be at least three support ribs, and most preferably four flexible support ribs are provided.

The term "a flexible edge of permanently stable shape" of the end wall refers to an edge which, if its shape is deformed by a force acting on it at room temperature, attempts of its own accord to resume its original shape after the force has been removed. The flexible edges of permanent shape preferably all have the same shape and dimensions.

Preferably, the edges of an end wall are arranged symmetrically with respect to one another and with respect to the longitudinal axis of the support sheath. With this arrangement, the end wall edges are disposed in such a manner that a common plane can be placed through the longitudinal axis of the support sheath and a line corresponding to one edge. If the end walls have only two edges, both of the edges will be disposed in a common plane which also contains the longitudinal axis of the support sheath.

The surfaces of the end wall portions preferably have a trapezoidal shape and are concavely curved in the direction of the longitudinal axis of the support sheath. The surfaces of the end wall portions narrow toward the center of the end wall.

The end walls each have a central opening, the circumference of which is defined by the free edges of the surfaces of the end wall portions. The edges of the end wall portions belonging to each pair of laterally adjacent end wall portions terminate at the rim of the central opening.

The edges of the end wall can be constructed as permanently shaped sheet edges or as heat-sealed or fused seam edges. The term "fused seam edges" also embraces those fused seams having adjacent thereto outwardly-projecting, triangular, double-layer flaps of sheet material; said flaps being open on one side and having a folded edge, which folded edge forms an angle with the fused seam.

According to a preferred embodiment of the invention, the flaps of sheet material are folded over onto the end walls by folding them around the fused seam as a folding axis and are firmly joined to the end wall surfaces, for example, by fusing them together.

The central openings of the end walls preferably have a shape and size which, when the article is used for its intended purpose, permits the filling tube of a filling machine for material to be filled to be introduced easily into the hollow space of the rod through the opening in the container end wall. At the same time, the end wall is constructed in such a manner that it ensures that the shape of the hollow rod in the hollow interior cavity of the support sheath will be fixed.

The central openings in the ends of the support sheath are arranged with respect to one another in such a manner that their centers are located on a straight line which coincides with the longitudinal axis of the hollow interior space of the hollow rod.

Because of the indicated spatial construction of the end walls, the phrase "shaped like a truncated pyramid" is used to describe their shape. This phrase also applies to end wall designs in which the lines corresponding to the end wall edges slope only very slightly from the base of the end wall toward the end wall opening.

The inside of the support sheath casing lies either directly adjacent the outside of the hollow rod or a small distance from it. The support sheath casing is at least as long as the hollow rod. If a certain amount of longitudinal expansion of a wet hollow rod of cellulose hydrate tubing is deemed desirable as a result of the article being soaked or moistened with water before being used for its intended purpose, the length of the support sheath can be modified accordingly.

The cylindrical portion of the support sheath preferably is provided with a plurality of perforations which advantageously have identical shapes and dimensions. It is particularly advantageous if the perforations are uniformly distributed over the whole length and circumference of the support sheath casing. The perforations permit the hollow rod in the hollow interior cavity of the container to be soaked more quickly with moistening liquid during the use of the article for its intended purpose. The number, shape and size of the perforations in the support sheath casing must be selected in such a manner that the shape- and position-fixing functions of the sheath are not detrimentally affected by the perforations.

The wall thickness of the support sheath is not critical so long as it does not adversely affect the desired characteristics and protective functions of the sheath. If the support sheath, in its preferred embodiment, is made of polyethylene film, the film advantageously may have a thickness in the range of between about 100 and 250 $\mu$m.

In the following text, an example of a process is described which can be used to produce the article of manufacture of the present invention.

A straight mandrel with a stable shape is disposed as a support element in the hollow interior space of a hollow rod of a longitudinally gathered packing tube, such as a tube of fiber-reinforced cellulose hydrate. The length of the mandrel is such that it projects from both ends of the hollow space of the rod. A hollow cylindrical sheath of formable sheet material, such as polyethylene, is then arranged around the hollow rod. The length of the sheath is such that its end sections project past the ends of the hollow rod. The projecting ends of the sheath preferably are equal in length. The inside diameter of the sheath preferably matches the outside diameter of the hollow rod.

Four folds are formed in the projecting end parts of the sheath around the circumference thereof by partially turning the projecting parts radially inwardly toward the longitudinal axis of the sheath. This is done with the aid of a correspondingly shaped stamping tool, by exerting a pressure on four flat regions arranged with parallel spacing longitudinally axially and symmetrically with respect to one another, in such a manner that their outwardly-projecting edges extend symmetrically with respect to the longitudinal axis of the sheath and preferably with respect to each other and that a common plane can be placed through the longitudinal axis of the sheath and through each folded edge.

As the folds are being formed in the projecting parts of the sheath, their insides can be partially supported along straight, longitudinally axial lines. This can be achieved, for example, by use of pin-like support elements. The course of the lines of support corresponds to the course of the folded edges which are to be formed. The above-mentioned support is advantageously provided along four lines disposed symmetrically with respect to one another.

After the folds have been formed, the partial linear supports for the projecting parts of the tubular sheath are removed. This is accomplished, for example, by withdrawing the pinlike support elements from the hollow space defined by the projecting parts of the sheath.

The shapes of the folded edges are then made permanent. When using tubular sheaths of polyethylene, this can be accomplished, for example, by first using external mechanical means to prevent the shape of the fold from changing, by thereafter applying sufficient heat to the areas of sheet material forming the folds to convert them to a thermoplastic state, and by then cooling the folds to room temperature and removing the shape-fixing means. Another preferred way of forming an edge of stable shape is to firmly join the sides of the sheet material of the fold by heat-sealing or fusing them together. The fusing of the layers may extend either over the whole area of the flaps or only along a straight seam in order to form an edge having a permanent shape. It may also be desirable to enclose the edge of the fold by fusing the layers of sheet material.

The formation of folds in the projecting end portions of the hollow sheath and the subsequent permanent fixing of the shape of the folds can be achieved, for example, by means of a central, tong-like stamping tool of appropriate construction, whereby the folds are necessarily formed simultaneously.

When flexible sheaths of thermoplastic material (e.g., polyethylene) are used for producing the support sheath, it is necessary in order to produce folds having a permanent shape that after the folds are formed, the respective sides of the folds be firmly joined to one another. This can be accomplished, for example, by making the tool used to form the folds heatable and, after forming the folds, by fusing together their associated sides with the heated tool.

If a support mandrel is used in the hollow space of the hollow rod during production of the support sheath, the mandrel may serve as a thrust support for receiving the pressure used to form the folds.

The invention will be further described with reference to the accompanying drawing, the single FIGURE of which is a lateral perspective view of the article of manufacture of the invention.

In this FIGURE, reference character A denotes the support sheath, and reference character B designates the hollow rod in the hollow interior of the sheath.

The hollow cylindrical casing of the support sheath is designated by reference numeral 1. The permanently shaped, integral end wall of the sheath constructed in the shape of a truncated pyramid is designated by 2. The part identified by reference numeral 3 is the transition area from the hollow cylindrical casing 1 to the end wall 2. Reference numeral 4 denotes the central opening in the end wall 2, and reference numeral 5 identifies an end wall edge constructed as a fused seam. Reference numeral 6 relates to the surface of an end wall portion which is bounded laterally by the end wall edges 5. Reference numeral 7 denotes the free edge of the surface of one end wall portion.

5.1 is a particular embodiment of the edge of the fused seam in the form of a double-layer, triangular flap of sheet material, open on one side, with a folded edge which is folded back against the end wall portion surface 6 around the edge 5 as a folding axis, and is heat-sealed to the end wall portion surface 6.

The foregoing description has been set forth by way of example and not by way of limitation. Since modifications of the disclosed embodiments within the scope and spirit of the invention may occur to persons skilled in the art, the scope of the invention is to be construed solely with respect to the appended claims.

What is claimed is:

1. An article of manufacture comprising a one-piece container-like, hollow cylindrical support sheath and an open-ended hollow rod of longitudinally gathered, cellulose hydrate tubing disposed in the interior of said support sheath with the support sheath surrounding said hollow rod while leaving the open end of the hollow rod free; said hollow rod constituting a formed, but unutilized, sausage casing; said support sheath being made from a formable, flexible sheet of fusible, thermoplastic polymer material and being disposed around said hollow rod with the length of said sheath being such that the ends of the sheath project beyond the ends of the hollow rod; at least two outwardly projecting, permanently shaped, stable folds being formed in each of the projecting ends of said sheath with said folds being disposed radially with respect to the center of said sheath whereby the inside diameters of the projecting ends of said sheath are partially narrowed to form integral sheath end walls with an opening in each end wall, the sides of said folds being fused together to make the folds permanent whereby outwardly projecting, double layer, triangular flaps of sheet material are produced adjacent the fused seams, each flap having an open end and a folded edge forming an angle with the fused seam; said flaps being folded down around the fused seams as a folding axis against the sheath end walls and firmly fused to said end walls; said end walls ensuring that the shape and position of the hollow rod in the interior of the support sheath are fixed when the hollow rod is soaked in water or moistened.

2. Article of manufacture according to claim 1, wherein the sheath end walls comprise four symmetrically arranged, permanently shaped end wall edges.

3. An article of manufacture according to claim 1, wherein said support sheath is made of a polyethylene film having a thickness in the range of between about 100 and 250 μm.

4. Article of manufacture according to claim 1, wherein the support sheath is formed of polyethylene.

* * * * *